US012546098B2

United States Patent
Ye et al.

(10) Patent No.: US 12,546,098 B2
(45) Date of Patent: Feb. 10, 2026

(54) DOUBLE-HANDLE FAUCET

(71) Applicant: Xiamen Lota International Co., Ltd., Fujian (CN)

(72) Inventors: Liming Ye, Fujian (CN); Shuanglin Bai, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 0 days.

(21) Appl. No.: 18/899,177

(22) Filed: Sep. 27, 2024

(65) Prior Publication Data

US 2025/0327284 A1     Oct. 23, 2025

(30) Foreign Application Priority Data

Apr. 22, 2024  (CN) .......................... 202410486829.0
Aug. 27, 2024  (CN) .......................... 202411183313.5

(51) Int. Cl.
    *E03C 1/04*      (2006.01)
(52) U.S. Cl.
    CPC ................................ *E03C 1/0402* (2013.01)
(58) Field of Classification Search
    CPC .............................. E03C 1/0402; E03C 1/0401
    See application file for complete search history.

(56) References Cited

U.S. PATENT DOCUMENTS

| | | | | |
|---|---|---|---|---|
| 5,465,749 A * | 11/1995 | Sauter | ..................... | F16L 41/16 137/315.15 |
| 7,698,755 B2 * | 4/2010 | McNerney | ............ | E03C 1/0401 4/695 |
| 8,881,755 B2 * | 11/2014 | Thomas | ................ | F16K 27/045 137/271 |
| 8,925,571 B2 * | 1/2015 | Li | ......................... | E03C 1/0402 4/677 |
| 9,051,719 B2 * | 6/2015 | Li | ......................... | E03C 1/0402 |
| 9,109,350 B2 * | 8/2015 | Zhu | ......................... | E03C 1/06 |
| 9,303,391 B2 * | 4/2016 | Leichty | ................. | E03C 1/0403 |
| 9,376,791 B2 * | 6/2016 | Wilkerson | ............ | E03C 1/0401 |
| 9,689,148 B2 * | 6/2017 | Zou | ........................ | E03C 1/0402 |
| 9,702,126 B1 * | 7/2017 | Feher | .................... | E03C 1/0403 |
| 11,060,267 B2 * | 7/2021 | Mooren | ................ | E03C 1/0401 |
| 11,136,749 B2 * | 10/2021 | Shen | ..................... | E03C 1/0402 |

(Continued)

FOREIGN PATENT DOCUMENTS

CN        103243782 A    *  8/2013  ........... E03C 1/0402

*Primary Examiner* — David Colon-Morales
(74) *Attorney, Agent, or Firm* — Cooper Legal Group, LLC

(57) ABSTRACT

A double-handle faucet includes a water outlet member, a countertop installation assembly, and two valve assemblies. A mounting base and two valve body cavities are fixedly disposed on a panel body. A mounting panel and a locking assembly are respectively disposed on an upper side and a lower side of a countertop. The two valve assemblies are respectively connected to the two valve body cavities. The water outlet member is detachably connected to the mounting base. A valve body water channel is formed within the mounting panel connected to each of the two valve body cavities. A water outlet pipe is connected to a lower side of the mounting panel and is in communication with the valve body water channel. The water outlet pipe extends through the mounting base, and the water outlet pipe is fluidly connected to the water outlet member.

26 Claims, 19 Drawing Sheets

(56) References Cited

U.S. PATENT DOCUMENTS

| | | | | |
|---|---|---|---|---|
| 11,408,156 B2* | 8/2022 | Zhang | ............... | F16K 19/006 |
| 11,702,823 B2* | 7/2023 | Benstead | ............. | E03C 1/0402 |
| | | | | 4/695 |
| 12,054,926 B1* | 8/2024 | Ding | ................ | E03C 1/0412 |
| 12,065,812 B2* | 8/2024 | Currey | .............. | E03C 1/0402 |
| 2019/0284785 A1* | 9/2019 | Mu | .................. | E03C 1/0402 |

* cited by examiner

DOUBLE-HANDLE FAUCET

RELATED APPLICATIONS

This application claims priority to Chinese patent application number 202410486829.0, filed on Apr. 22, 2024, and Chinese patent application number 202411183313.5, filed on Aug. 27, 2024. Chinese patent application number 202410486829.0 and Chinese patent application number 202411183313.5 are incorporated herein by reference.

FIELD OF THE DISCLOSURE

The present disclosure relates to the field of sanitary products, specifically to a dual-handle faucet.

BACKGROUND OF THE DISCLOSURE

In existing technologies, double-handle basin faucets are typically installed and secured using an under-counter nut structure. The double-handle basin faucets usually comprise a spout and two valve assemblies. A lower end of each of the spout and the two valve assemblies comprises a threaded pipe, and the threaded pipes pass through mounting holes on a countertop. The threaded pipes extend through the installation holes and are fastened underneath the countertop by screwing nuts onto the threaded pipes. The nuts are tightened until the nuts press an underside of the countertop, securing the three components in place. Afterward, the water connections are made. However, this installation method requires separately securing three nuts, and all work must be performed under the countertop, making the process tedious and complicated.

There is existing technology for faucet installation that comprises a mounting base, a screw rod, a nut, a lifting seat that moves up and down when the screw rod is rotated to drive the nut, and two lever arms. The mounting base has a mounting hole, and the screw rod is placed on a side of the mounting hole. The two lever arms are pivotally connected to the lifting seat. This method allows for faucet installation from above the countertop, simplifying assembly and eliminating the need to rely on the faucet's own structure, making it compatible with various faucet designs. Additionally, only a single screw rod is used, minimizing the space occupied by the installation hole and allowing the faucet hoses to pass through smoothly. However, the two valve assemblies on two sides of the spout still require under-counter nuts for installation, preventing a complete one-step installation process.

BRIEF SUMMARY OF THE DISCLOSURE

The objective of the present disclosure is to overcome at least one of the deficiencies present in the existing technologies by providing a faucet that allows two valve assemblies and a water outlet member to be installed onto a countertop from above.

In order to solve the above technical problems, the present disclosure provides a double-handle faucet comprising a water outlet member, a countertop installation assembly, and two valve assemblies.

The countertop installation assembly comprises a mounting panel and a locking assembly. The mounting panel comprises a panel body, a mounting base, and two valve body cavities, and the mounting base and the two valve body cavities are fixedly disposed on the panel body. The mounting panel is configured be disposed on an upper side of a countertop, and the locking assembly is correspondingly connected to a lower side of the mounting base. The mounting base is operatively coupled to the locking assembly to be configured to drive at least part of the locking assembly to abut a lower side of the countertop.

The two valve assemblies are respectively connected to the two valve body cavities, and the water outlet member is detachably connected to the mounting base.

A valve body water channel is formed within the mounting panel, and the valve body water channel is connected to each of the two valve body cavities. A water outlet pipe is connected to a lower side of the mounting panel, and the water outlet pipe is connected to the valve body water channel. The water outlet pipe extends through the mounting base, and the water outlet pipe is fluidly connected to the water outlet member.

In a preferred embodiment, the water outlet pipe comprises a first water outlet pipe and a second water outlet pipe, and the first water outlet pipe is connected to the lower side of the mounting panel. The second water outlet pipe is connected to the water outlet member, and the first water outlet pipe and the second water outlet pipe are connected together by a connector.

In a preferred embodiment, the mounting base comprises a passing channel penetrating through the mounting base, and the water outlet pipe passes through the passing channel.

In a preferred embodiment, lower ends of the two valve body cavities comprise connecting members, the two valve assemblies comprise water inlet pipes, and distal ends of the water inlet pipes are detachably connected to the connecting members.

In a preferred embodiment, the distal ends of the water inlet pipes and the connecting members are connected together via threading or buckling.

In a preferred embodiment, each of the two valve assemblies comprises a valve core and a handle assembly. The valve core is disposed in a corresponding one of the two valve body cavities, and the handle assembly is connected to the valve core.

In a preferred embodiment, the mounting base comprises a buckle member, and a lower end of the water outlet member is configured to be sleeved on the mounting base. The lower end of the water outlet member comprises a locking hole, and the buckle member is operatively locked to the locking hole.

The water outlet member comprises an operating button, and the operating button is configured to be pressed inward radially by an external force. The operating button is configured to push the buckle member to move radially to be separated from the locking hole.

The buckle member is configured to be elastically deformed to rotate around a lower end of the buckle member, and the buckle member comprises a buckling protrusion. An outer side of an upper end of the buckle member comprises a matching notch, and the operating button is configured to be elastically deformed to rotate around an upper end of the operating button. A lower end of the operating button is configured to be correspondingly matched with the matching notch, and when the operating button is pressed inward radially by the external force to rotate radially inward, the lower end of the operating button pushes the upper end of the buckle member inward to enable the buckling protrusion to be separated from the locking hole.

In a preferred embodiment, the lower end of the water outlet member comprises an operating through hole, and the operating button passes through the operating through hole.

In a preferred embodiment, the mounting base comprises a base body and a connecting sleeve, and the base body is integrally formed with the panel body. The connecting sleeve is sleeved outside the base body, and the water outlet member is detachably connected to the connecting sleeve.

In a preferred embodiment, the base body comprises a middle through hole, and the water outlet pipe passes through the middle through hole.

In a preferred embodiment, the locking assembly comprises a threaded column, a movable member, and an abutment member. The threaded column is operatively rotatably disposed on the mounting base, and the movable member is threaded to the threaded column. When the threaded column is rotated, the movable member moves up and down along the threaded column to abut the lower side of the countertop.

The locking assembly comprises a plug and two guiding pins. The plug is located below the mounting base, the two guiding pins are connected to the plug and the mounting base, and the movable member is slidably disposed on the two guiding pins.

The abutment member comprises two rotating rods, and the two rotating rods are rotatably connected to two sides of the movable member. Rotation centers of the two rotating rods are offset from middle positions of the two rotating rods.

In a preferred embodiment, the double-handle faucet comprises a decorative panel, and the decorative panel covers an upper side of the mounting panel.

In a preferred embodiment, the locking assembly comprises a threaded rod, a connection base, a guiding member, a base, and two supporting arms. The threaded rod and the guiding member are each connected to the base, and the connection base is connected to and guided by the guiding member. The connection base is threaded to the threaded rod, and the threaded rod is configured to be rotated by an external force to drive the connection base to move adjacent to or away from the base.

Sides of the two supporting arms are respectively pivotally connected to two side end surfaces of the connection base, and the base comprises two blocking inclined walls. The two supporting arms are configured to be moved adjacent to the two blocking inclined walls to be rotated to be in a folded state, and the two supporting arms are configured to be moved away from the two blocking inclined walls to be rotated to be in an unfolded state. When in the unfolded state, a radial dimension of the two supporting arms is larger than a size of a mounting hole of the countertop. An angle between the two side end surfaces of the connection base is between 25 degrees and 75 degrees, and an angle of an inclined surface of each of the two blocking inclined walls is between 45 degrees and 85 degrees.

In a preferred embodiment, the angle between the two side end surfaces of the connection base is 60 degrees, and the angle of the inclined surface of each of the two blocking inclined walls is 75 degrees.

In a preferred embodiment, the two side end surfaces are respectively disposed with two supporting blocks, and first ends of the two supporting arms are pivotally connected to the two side end surfaces. When in the unfolded state, second ends of the two supporting arms are supported on the two supporting blocks.

In a preferred embodiment, the two supporting blocks are located below the two supporting arms, and lower sides of the second ends of the two supporting arms are supported on the two supporting blocks.

In a preferred embodiment, insides of the two blocking inclined walls comprise two position-provided slots, and when the connection base moves adjacent to the two blocking inclined walls, the two supporting blocks enter the two position-provided slots.

In a preferred embodiment, two pivot shafts are disposed on the two side end surfaces, and the two supporting arms are pivotally connected to the two pivot shafts.

In a preferred embodiment, the base comprises a bottom plate, a seat, and the two blocking inclined walls, and the seat and the two blocking inclined walls are placed on the bottom plate. The two blocking inclined walls are disposed on two sides of the seat, and the threaded rod and the guiding member are connected to the seat.

In a preferred embodiment, the guiding member comprises two guiding pins.

In a preferred embodiment, the threaded rod and the guiding member are connected to the base and the mounting base, and the threaded rod is rotatably mounted on the mounting base In a preferred embodiment, when the two supporting arms are in the folded state, front sides and rear sides of the two supporting arms extend beyond the connection base and the base.

In a preferred embodiment, the threaded rod and the guiding member are within a vertical projection of the connection base.

Compared with the existing techniques, the technical solution has the following advantages.

1. Since the valve body water channel is formed within the mounting panel, after the two valve assemblies are connected to the two valve body cavities, no additional pipes are required to be connected to the water outlet member, reducing a number of components installed below the countertop and making installation more convenient. A first end of the water outlet pipe is connected to a lower side of the mounting panel, and a second end of the water outlet pipe passes through the mounting base and is correspondingly connected to a water outlet head at a distal end of the water outlet member. The entire structure and connection are simpler and less cluttered. The water outlet member is detachably connected to the mounting base. During installation, all components except the water outlet member can be pre-installed on the mounting panel to form an integrated structure with the countertop installation assembly and the valve assemblies. Then, the integrated structure is placed on the upper side of the countertop, and the locking assembly passes through a mounting hole of the countertop to be correspondingly disposed below the countertop. The locking assembly can be moved upward to abut the lower side of the countertop via a structure on the mounting base, securing the mounting panel to the countertop. Finally, the water outlet member is connected to the mounting base, completing the installation.

Sides of the two supporting arms are respectively pivotally connected to two side end surfaces of the connection base, and the base comprises two blocking inclined walls. The two supporting arms are configured to be moved adjacent to the two blocking inclined walls to be rotated to be in a folded state, and the two supporting arms are configured to be moved away from the two blocking inclined walls to be rotated to be in an unfolded state. When in the unfolded state, a radial dimension of the two supporting arms is larger than a size of a mounting hole of the countertop, an angle between the two side end surfaces of the connection base is between 25 degrees and 75 degrees, and an angle of an inclined surface of each of the two blocking inclined walls is between 45 degrees and 85 degrees. The angle between the two side end surfaces of the connection base and the angle of the inclined surface of each of the two blocking inclined walls enable the radial dimension of the two supporting arms to be minimized when in the folded state and maximized when in the unfolded state, making the locking assembly suitable for smaller mounting holes.

DETAILED DESCRIPTION OF THE EMBODIMENTS

Figure 1:
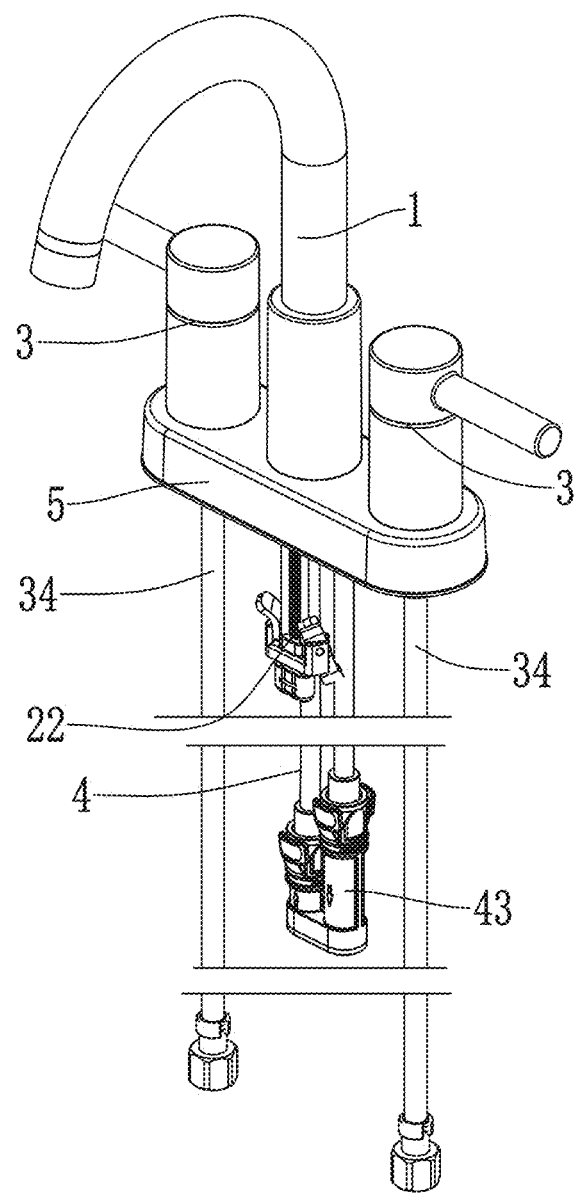
FIG. 1 illustrates a perspective view of a double-handle faucet in Embodiment 1 of the present disclosure.
Figure 2:
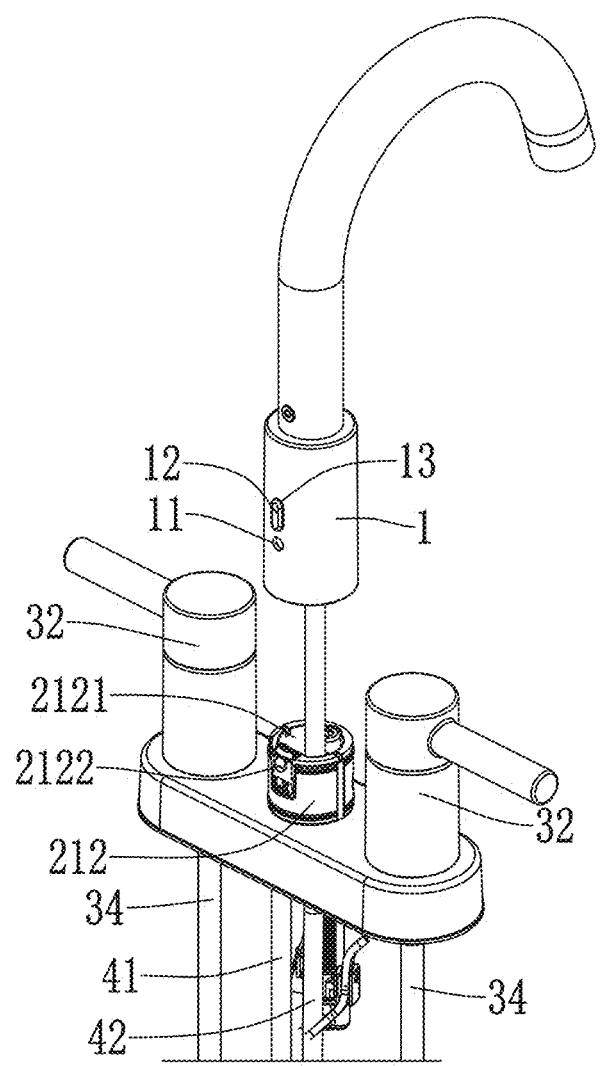
FIG. 2 illustrates a perspective view of the double-handle faucet in Embodiment 1 of the present disclosure, when a water outlet member is detached from a mounting base.
Figure 3:
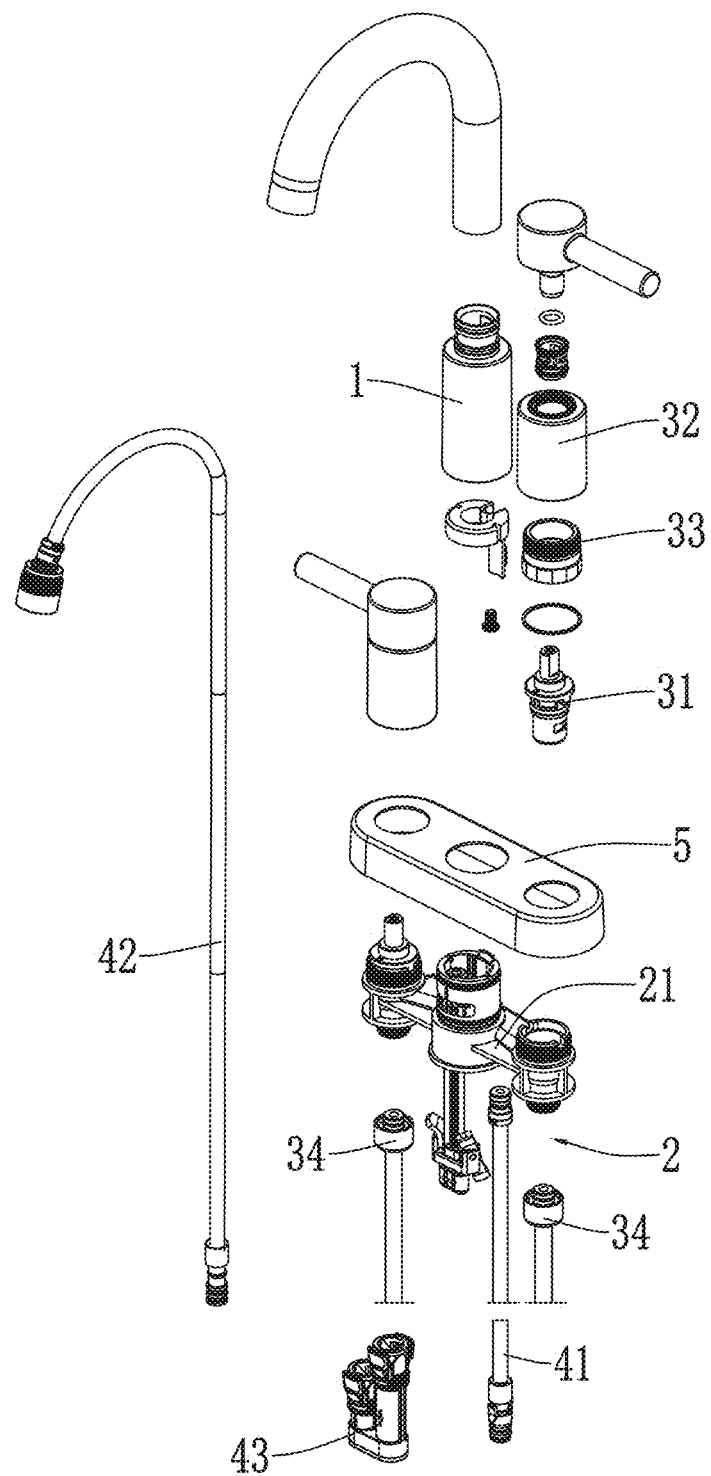
FIG. 3 illustrates an exploded view of the double-handle faucet in Embodiment 1 of the present disclosure.
Figure 4:
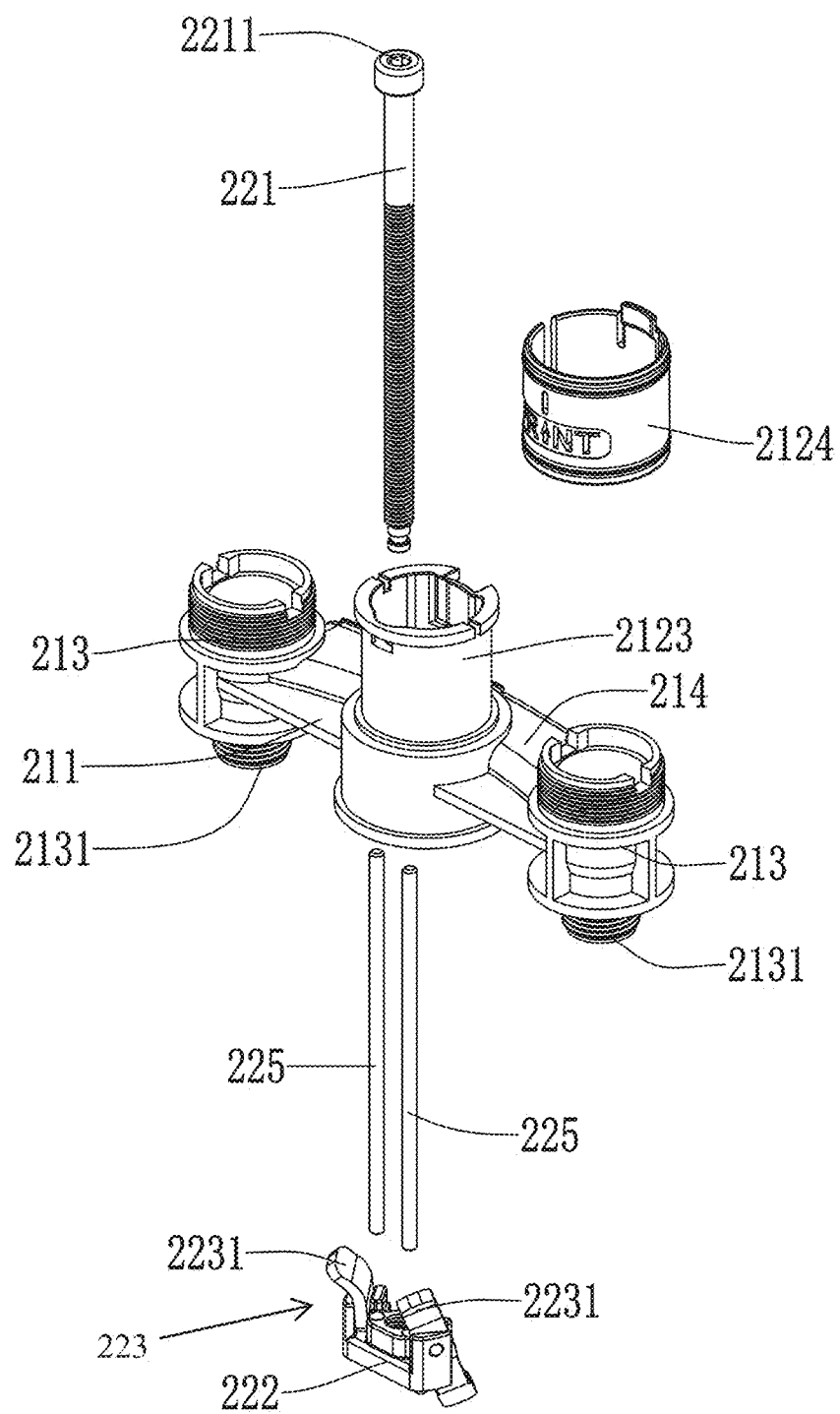
FIG. 4 illustrates an exploded view of a countertop installation assembly in Embodiment 1 of the present disclosure.
Figure 5:
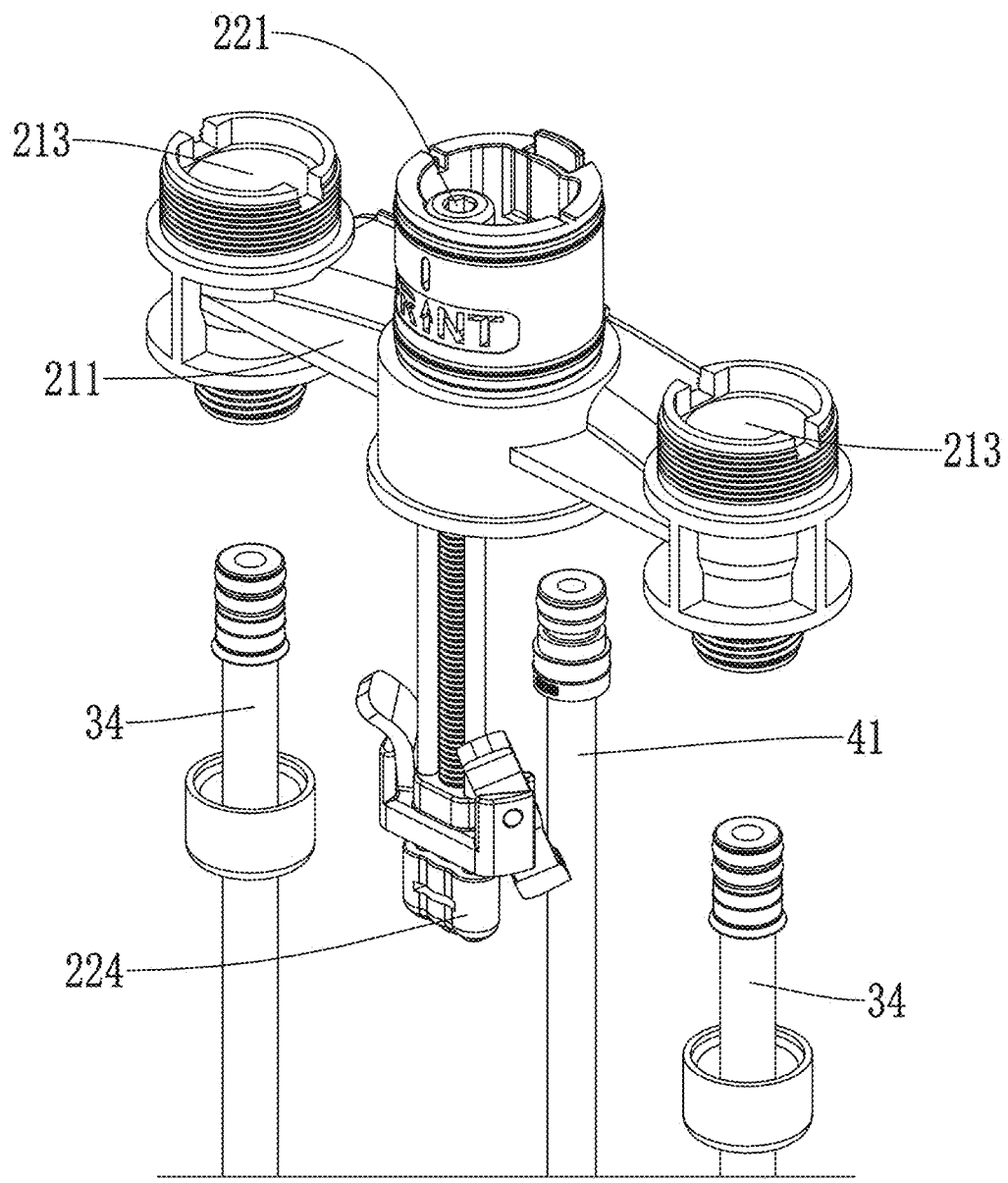
FIG. 5 illustrates an exploded view of water inlet pipes and two valve body cavities in Embodiment 1 of the present disclosure.

The present disclosure will be further described below in conjunction with the accompanying drawings and embodiments.

Embodiment 1

Referring to FIGS. 1 to 6, a double-handle faucet is illustrated. The double-handle faucet comprises a water outlet member 1, a countertop installation assembly 2, and two valve assemblies 3.

The countertop installation assembly 2 comprises a mounting panel 21 and a locking assembly 22. The mounting panel 21 comprises a panel body 211, a mounting base 212, and two valve body cavities 213, and the mounting base 212 and the two valve body cavities 213 are fixedly disposed on the panel body 211. The panel body 211 is in a shape of an elongated plate. The two valve body cavities 213 are respectively disposed on two ends of the panel body 211, and the mounting base 212 is disposed on a middle position of the panel body 211.

The mounting panel 21 is configured be disposed on an upper side of a countertop, and the locking assembly 22 is correspondingly connected to a lower side of the mounting base 212. The mounting base 212 is operatively coupled to the locking assembly 22 to be configured to drive at least part of the locking assembly 22 to abut a lower side of the countertop. The two valve assemblies 3 are respectively connected to the two valve body cavities 213, and the water outlet member 1 is detachably connected to the mounting base 212. A valve body water channel 214 is formed within the mounting panel 21, and the valve body water channel 214 is connected to each of the two valve body cavities 213. A water outlet pipe 4 is connected to a lower side of the panel body 211, and the water outlet pipe 4 is connected to the valve body water channel 214. The water outlet pipe 4 extends through the mounting base 212, and the water outlet pipe 4 is fluidly connected to the water outlet member 1.

Since the valve body water channel 214 is formed within the mounting panel 21, after the two valve assemblies 3 are connected to the two valve body cavities 213, no additional pipes are required to be connected to the water outlet member 1, reducing a number of components installed below the countertop and making installation more convenient. A first end of the water outlet pipe 4 is connected to a lower side of the mounting panel 21, and a second end of the water outlet pipe 4 passes through the mounting base 212 and is correspondingly connected to a water outlet head at a distal end of the water outlet member 1. The entire structure and connection are simpler and less cluttered. The water outlet member 1 is detachably connected to the mounting base 212. During installation, all components except the water outlet member 1 can be pre-installed on the mounting panel 21 to form an integrated structure with the countertop installation assembly 2 and the valve assemblies 3. Then, the integrated structure is placed on the upper side of the countertop, and the locking assembly 22 passes through a mounting hole of the countertop to be correspondingly disposed below the countertop. The locking assembly 22 can be moved upward to abut the lower side of the countertop via a structure on the mounting base 212, securing the mounting panel 21 to the countertop. Finally, the water outlet member 1 is connected to the mounting base 212, completing the installation.

In this embodiment, the water outlet pipe 4 comprises a first water outlet pipe 41 and a second water outlet pipe 42. The first water outlet pipe 41 is connected to the lower side of the mounting panel 21, and the second water outlet pipe 42 is connected to the water outlet member 1. The first water outlet pipe 41 and the second water outlet pipe 42 are connected together by a connector 43. During installation, the second water outlet pipe 42 is first connected to the water outlet member 1. When the water outlet member 1 is installed onto the mounting base 212, a lower end of the second water outlet pipe 42 passes through the mounting base 212 until the lower end of the second water outlet pipe 42 reaches below the countertop. After the water outlet member 1 is installed on the mounting base 212, the first water outlet pipe 41 and the second water outlet pipe 42 can be connected via the connector 43. The connector 43, the first water outlet pipe 41, and the second water outlet pipe 42 are quickly connected through a buckle structure.

In this embodiment, the mounting base 212 comprises a passing channel 2121 penetrating therethrough, and the second water outlet pipe 42 passes through the passing channel 2121.

In this embodiment, lower ends of the two valve body cavities 213 comprise connecting members 2131. The two valve assemblies 3 comprise water inlet pipes 34, and distal ends of the water inlet pipes 34 are detachably connected to the connecting members 2131. A connection between the distal ends of the water inlet pipes 34 and the connecting members 2131 can be made via threading or buckling.

In this embodiment, each of the two valve assemblies 3 comprises a valve core 31 and a handle assembly 32. The valve core 31 is disposed in a corresponding one of the two valve body cavities 213, and the handle assembly 32 is connected to the valve core 31. An upper end of each of the two valve body cavities 213 comprises external threads, and each of the two valve assemblies 3 comprises a valve cover 33. After the valve core 31 is disposed in the corresponding one of the two valve body cavities 213, the valve cover 33 is threadedly connected to the upper end of the corresponding one of the two valve body cavities 213. The valve cover 33 presses the valve core 31 to enable the valve core 31 to be secured within the corresponding one of the two valve body cavities 213. The handle assembly 32 is connected to the valve core 31 to control the valve core 31. Water flows through the water inlet pipes 34 into the two valve body cavities 213. The handle assemblies 32 of the two valve assemblies 3 are configured to control the valve cores 31 of the two valve assemblies 3 to regulate a proportion of water from the two valve assemblies 3 entering the valve body water channel 214. The two valve assemblies 3 respectively control a proportion of two water flows entering the valve body water channel 214. In this embodiment, the two valve assemblies 3 are respectively in communication with hot water and cold water to form mixed water, and the mixed water then flows through the water outlet pipe 4 and out from the distal end of the water outlet member 1.

In this embodiment, the mounting base 212 comprises a buckle member 2122. A lower end of the water outlet member 1 can be sleeved on the mounting base 212. The lower end of the water outlet member 1 comprises a locking hole 11, and the buckle member 2122 is operatively locked to the locking hole 11. The water outlet member 1 further comprises an operating button 12. The operating button 12 can be pressed inward radially by an external force, and the operating button 12 is configured to push the buckle member 2122 to move radially to be separated from the locking hole 11. The buckle member 2122 can be elastically deformed to rotate around a lower end of the buckle member 2122. The buckle member 2122 comprises a buckling protrusion 2125. An outer side of an upper end of the buckle member 2122 comprises a matching notch 2126. The operating button 12 can elastically deformed to rotate around an upper end of the operating button 12, and a lower end of the operating button 12 can be correspondingly matched with the matching notch 2126. When the operating button 12 is pressed inward radially by the external force to rotate radially inward, the lower end of the operating button 12 pushes the upper end of the buckle member 2122 inward to enable the buckling protrusion 2125 to be separated from the locking hole 11. The lower end of the water outlet member 1 further comprises an operating through hole 13, and the operating button 12 passes through the operating through hole 13.

In this embodiment, the mounting base 212 comprises a base body 2123 and a connecting sleeve 2124. The base body 2123 is integrally formed with the panel body 211, and the connecting sleeve 2124 is sleeved outside the base body 2123. The water outlet member 1 is detachably connected to the connecting sleeve 2124. The base body 2123 comprises a middle through hole 2127, and the water outlet pipe 4 passes through the middle through hole 2127.

In this embodiment, the locking assembly 22 comprises a threaded column 221, a movable member 222, and an abutment member 223. The threaded column 221 is operatively rotatably disposed on the mounting base 212, and the movable member 222 is threaded onto the threaded column 221. When the threaded column 221 is rotated, the movable member 222 can move up and down along the threaded column 221 to abut the lower side of the countertop. The locking assembly 22 further comprises a plug 224 and two guiding pins 225. The plug 224 is located below the mounting base 212, and the two guiding pins 225 are connected to the plug 224 and the mounting base 212. The movable member 222 is slidably disposed on the two guiding pins 225. The abutment member 223 comprises two rotating rods 2231, and the two rotating rods 2231 are rotatably connected to two sides of the movable member 222. Rotation centers of the two rotating rods 2231 are offset from middle positions of the two rotating rods 2231. As a result, the two rotating rods 2231 will droop due to gravity. When upper ends of the two rotating rods 2231 abut the lower side of the countertop, the two rotating rods 2231 will rotate accordingly until the entire rod bodies of the two rotating rods 2231 abut the lower side of the countertop, which is a conventional structure that will not be further elaborated upon here. An upper end of the threaded column 221 comprises a connecting port 2211. The connecting port 2211 is a hex socket. The connecting port 2211 is located on an upper side of the mounting base 212, so the user can directly operate the connecting port 2211 from above the countertop to enable the locking assembly 22 to be connected to the countertop. The countertop is clamped between the mounting panel 21 and the locking assembly 22.

The double-handle faucet further comprises a decorative panel 5, which covers the upper side of the mounting panel 21.

Embodiment 2

Referring to FIGS. 7 to 19, a double-handle faucet is illustrated. The double-handle faucet comprises a water outlet member 1, a countertop installation assembly 2, and two valve assemblies 3.

The countertop installation assembly 2 comprises a mounting panel 21 and a locking assembly 22. The mounting panel 21 comprises a panel body 211, a mounting base 212, and two valve body cavities 213, and the mounting base 212 and the two valve body cavities 213 are fixedly disposed on the panel body 211. The panel body 211 is in a shape of an elongated plate. The two valve body cavities 213 are respectively disposed on two ends of the panel body 211, and the mounting base 212 is disposed on a middle position of the panel body 211.

The mounting panel 21 is configured be disposed on an upper side of a countertop, and the locking assembly 22 is correspondingly connected to a lower side of the mounting base 212. The mounting base 212 is operatively coupled to the locking assembly 22 to be configured to drive at least part of the locking assembly 22 to abut a lower side of the countertop. The two valve assemblies 3 are respectively connected to the two valve body cavities 213, and the water outlet member 1 is detachably connected to the mounting base 212. A valve body water channel 214 is formed within the mounting panel 21, and the valve body water channel 214 is connected to each of the two valve body cavities 213. A water outlet pipe 4 is connected to a lower side of the panel body 211, and the water outlet pipe 4 is connected to the valve body water channel 214. The water outlet pipe 4 extends through the mounting base 212, and the water outlet pipe 4 is fluidly connected to the water outlet member 1.

Since the valve body water channel 214 is formed within the mounting panel 21, after the two valve assemblies 3 are connected to the two valve body cavities 213, no additional pipes are required to be connected to the water outlet member 1, reducing a number of components installed below the countertop and making installation more convenient. A first end of the water outlet pipe 4 is connected to a lower side of the mounting panel 21, and a second end of the water outlet pipe 4 passes through the mounting base 212 and is correspondingly connected to a water outlet head at a distal end of the water outlet member 1. The entire structure and connection are simpler and less cluttered. The water outlet member 1 is detachably connected to the mounting base 212. During installation, all components except the water outlet member 1 can be pre-installed on the mounting panel 21 to form an integrated structure with the countertop installation assembly 2 and the valve assemblies 3. Then, the integrated structure is placed on the upper side of the countertop, and the locking assembly 22 passes through a mounting hole of the countertop to be correspondingly disposed below the countertop. The locking assembly 22 can be moved upward to abut the lower side of the countertop via a structure on the mounting base 212, securing the mounting panel 21 to the countertop. Finally, the water outlet member 1 is connected to the mounting base 212, completing the installation.

In this embodiment, the water outlet pipe 4 comprises a first water outlet pipe 41 and a second water outlet pipe 42. The first water outlet pipe 41 is connected to the lower side of the mounting panel 21, and the second water outlet pipe 42 is connected to the water outlet member 1. The first water outlet pipe 41 and the second water outlet pipe 42 are connected together by a connector 43. During installation, the second water outlet pipe 42 is first connected to the water outlet member 1. When the water outlet member 1 is installed onto the mounting base 212, a lower end of the second water outlet pipe 42 passes through the mounting base 212 until the lower end of the second water outlet pipe 42 reaches below the countertop. After the water outlet member 1 is installed on the mounting base 212, the first water outlet pipe 41 and the second water outlet pipe 42 can be connected via the connector 43. The connector 43, the first water outlet pipe 41, and the second water outlet pipe 42 are quickly connected through a buckle structure.

In this embodiment, the mounting base 212 comprises a passing channel 2121 penetrating therethrough, and the second water outlet pipe 42 passes through the passing channel 2121.

In this embodiment, lower ends of the two valve body cavities 213 comprise connecting members 2131. The two valve assemblies 3 comprise water inlet pipes 34, and distal ends of the water inlet pipes 34 are detachably connected to the connecting members 2131. A connection between the distal ends of the water inlet pipes 34 and the connecting members 2131 can be made via threading or buckling.

In this embodiment, each of the two valve assemblies 3 comprises a valve core 31 and a handle assembly 32. The valve core 31 is disposed in a corresponding one of the two valve body cavities 213, and the handle assembly 32 is connected to the valve core 31. An upper end of each of the two valve body cavities 213 comprises external threads, and each of the two valve assemblies 3 comprises a valve cover 33. After the valve core 31 is disposed in the corresponding one of the two valve body cavities 213, the valve cover 33 is threadedly connected to the upper end of the corresponding one of the two valve body cavities 213. The valve cover 33 presses the valve core 31 to enable the valve core 31 to be secured within the corresponding one of the two valve body cavities 213. The handle assembly 32 is connected to the valve core 31 to control the valve core 31. Water flows through the water inlet pipes 34 into the two valve body cavities 213. The handle assemblies 32 of the two valve assemblies 3 are configured to control the valve cores 31 of the two valve assemblies 3 to regulate a proportion of water from the two valve assemblies 3 entering the valve body water channel 214. The two valve assemblies 3 respectively control a proportion of two water flows entering the valve body water channel 214. In this embodiment, the two valve assemblies 3 are respectively in communication with hot water and cold water to form mixed water, and the mixed water then flows through the water outlet pipe 4 and out from the distal end of the water outlet member 1.

In this embodiment, the mounting base 212 comprises a buckle member 2122. A lower end of the water outlet member 1 can be sleeved on the mounting base 212. The lower end of the water outlet member 1 comprises a locking hole 11, and the buckle member 2122 is operatively locked to the locking hole 11. The water outlet member 1 further comprises an operating button 12. The operating button 12 can be pressed inward radially by an external force, and the operating button 12 is configured to push the buckle member 2122 to move radially to be separated from the locking hole 11. The buckle member 2122 can be elastically deformed to rotate around a lower end of the buckle member 2122. The buckle member 2122 comprises a buckling protrusion 2125. An outer side of an upper end of the buckle member 2122 comprises a matching notch 2126. The operating button 12 can elastically deformed to rotate around an upper end of the operating button 12, and a lower end of the operating button 12 can be correspondingly matched with the matching notch 2126. When the operating button 12 is pressed inward radially by the external force to rotate radially inward, the lower end of the operating button 12 pushes the upper end of the buckle member 2122 inward to enable the buckling protrusion 2125 to be separated from the locking hole 11. The lower end of the water outlet member 1 further comprises an operating through hole 13, and the operating button 12 passes through the operating through hole 13.

In this embodiment, the mounting base 212 comprises a base body 2123 and a connecting sleeve 2124. The base body 2123 is integrally formed with the panel body 211, and the connecting sleeve 2124 is sleeved outside the base body 2123. The water outlet member 1 is detachably connected to the connecting sleeve 2124. The base body 2123 comprises a middle through hole 2127, and the water outlet pipe 4 passes through the middle through hole 2127.

The difference between this embodiment and Embodiment 1 lies in the structure of the locking assembly 22.

In this embodiment, the locking assembly 22 comprises a threaded rod 231, a connection base 232, a guiding member 233, a base 234, and two supporting arms 235. The threaded rod 231 and the guiding member 233 are each connected to the base 234. The connection base 232 is connected to and guided by the guiding member 233, and the connection base 232 is threaded to the threaded rod 231. The threaded rod 231 can be rotated by an external force to drive the connection base 232 to move adjacent to or away from the base 234. Sides of the two supporting arms 235 are respectively pivotally connected to two side end surfaces 2321 of the connection base 232. The base 234 comprises two blocking inclined walls 2341. The two supporting arms 235 can be moved adjacent to the two blocking inclined walls 2341 to be rotated to be in a folded state, and the two supporting arms 235 can be moved away from the two blocking inclined walls 2341 to be rotated to be in an unfolded state. In the unfolded state, a radial dimension of the two supporting arms 235 is larger than a size of the mounting hole of the countertop. An angle A between the two side end surfaces 2321 of the connection base 232 is between 25 degrees and 75 degrees. An angle B of an inclined surface of each of the two blocking inclined walls 2341 is between 45 degrees and 85 degrees. The angle A between the two side end surfaces 2321 of the connection base 232 and the angle B of the inclined surface of each of the two blocking inclined walls 2341 enable the radial dimension of the two supporting arms 235 to be minimized when in the folded state and maximized when in the unfolded state, making the locking assembly 22 suitable for smaller mounting holes.

Specifically, the angle A between the two side end surfaces 2321 of the connection base 232 is 60 degrees, and the angle B of the inclined surface of each of the two blocking inclined walls 2341 is 75 degrees. The two supporting arms 235 are plate-shaped and vertical to a horizontal plane. When in the unfolded state, an angle between the two supporting arms 235 is 60 degrees from a top view. When in the folded state, an angle between each of the two supporting arms 235 and the horizontal plane is 75 degrees from a side view, and the angle between the two supporting arms 235 from the top view is still a 60-degree angle. The 60-degree angle and the angle of 75 degrees allow the two supporting arms 235 to be more adjacent to each other, enabling the locking assembly 22 to pass through smaller mounting holes, increasing applicability.

In this embodiment, the two side end surfaces 2321 are respectively disposed with two supporting blocks 2322. First ends of the two supporting arms 235 are pivotally connected to the two side end surfaces 2321. When in the unfolded state, second ends of the two supporting arms 235 are supported on the two supporting blocks 2322. The two supporting blocks 2322 are located below the two supporting arms 235, and lower sides of the second ends of the two supporting arms 235 are supported on the two supporting blocks 2322. Insides of the two blocking inclined walls 2341 comprise two position-provided slots 2342. When the connection base 232 moves adjacent to the two blocking inclined walls 2341, the two supporting blocks 2322 enter the two position-provided slots 2342. Each of the two supporting arms 235 is divided into a long section 2351 and a short section 2352 relative to a pivot point, and the long section 2351 is longer than the short section 2352. The two supporting blocks 2322 are disposed adjacent to the long section 2351. The long section 2351 rotates due to gravity, causing a lower side of the long section 2351 to be supported on a corresponding one of the two supporting blocks 2322, keeping the two supporting arms 235 in the unfolded state. When the connection base 232 moves adjacent to the base 234, the long section 2351 is pushed by a distal end of a corresponding one of the two blocking inclined walls 2341, so that the two supporting arms 235 are rotated to be in the folded state. When the long section 2351 in the unfolded state abuts the distal end of the corresponding one of the two blocking inclined walls 2341, a distance between the distal end of the corresponding one of the two blocking inclined walls 2341 and the pivot point is greater than a distance between the corresponding one of the two supporting blocks 2322 and the pivot point.

In this embodiment, two pivot shafts 2323 are disposed on the two side end surfaces 2321, and the two supporting arms 235 are pivotally connected to the two pivot shafts 2323.

In this embodiment, the base 234 comprises a bottom plate 2343, a seat 2344, and the two blocking inclined walls 2341. The seat 2344 and the two blocking inclined walls 2341 are placed on the bottom plate 2343, and the two blocking inclined walls 2341 are disposed on two sides of the seat 2344. The threaded rod 231 and the guiding member 233 are connected to the seat 2344.

In this embodiment, the guiding member 233 comprises two guiding pins 2331.

In this embodiment, when the two supporting arms 235 are in the folded state, front sides and rear sides of the two supporting arms 235 extend beyond the connection base 232 and the base 234. Front sides and rear sides of the connection base 232 and base 234 have been reduced, making a radial thickness in a front-and-rear direction smaller and suitable for even smaller mounting holes.

In this embodiment, the threaded rod 231 and the guiding member 233 are within a vertical projection of the connection base 232, further reducing the radial thickness.

Figure 6:
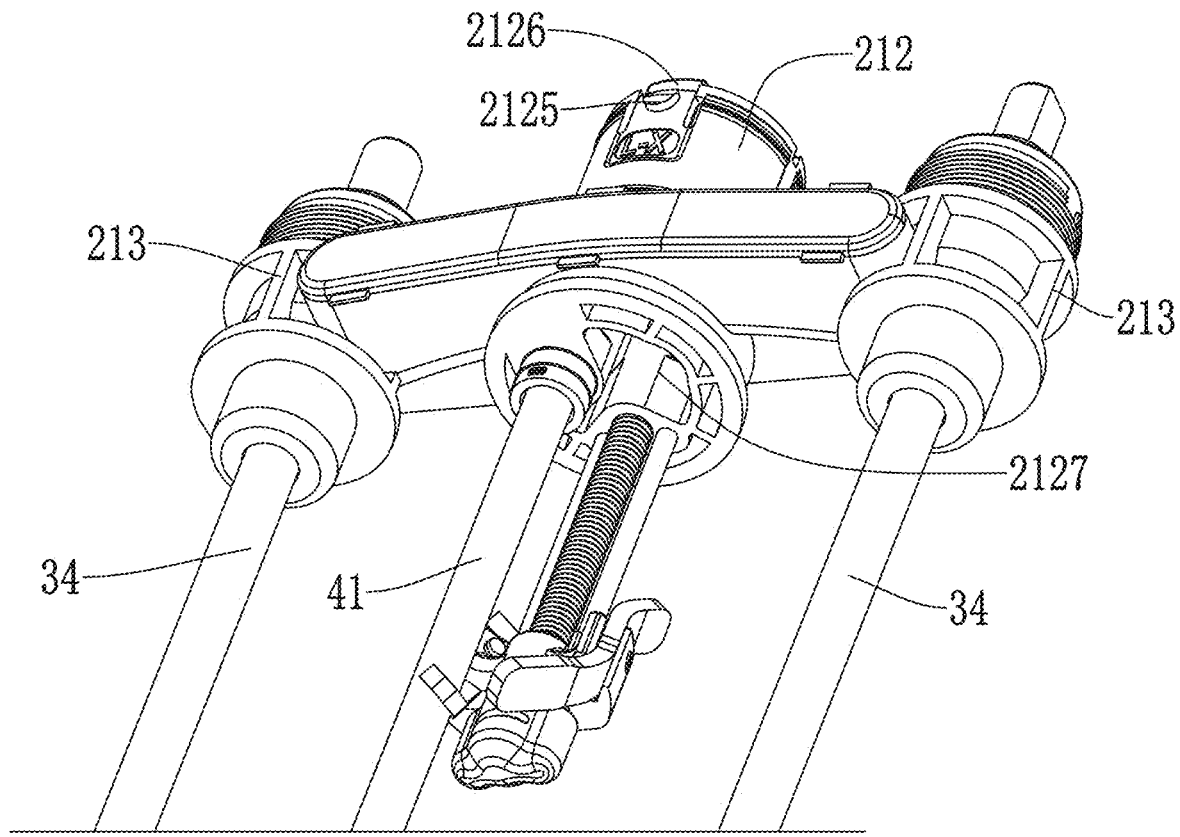
FIG. 6 illustrates a bottom view of the countertop installation assembly in Embodiment 1 of the present disclosure.
Figure 7:
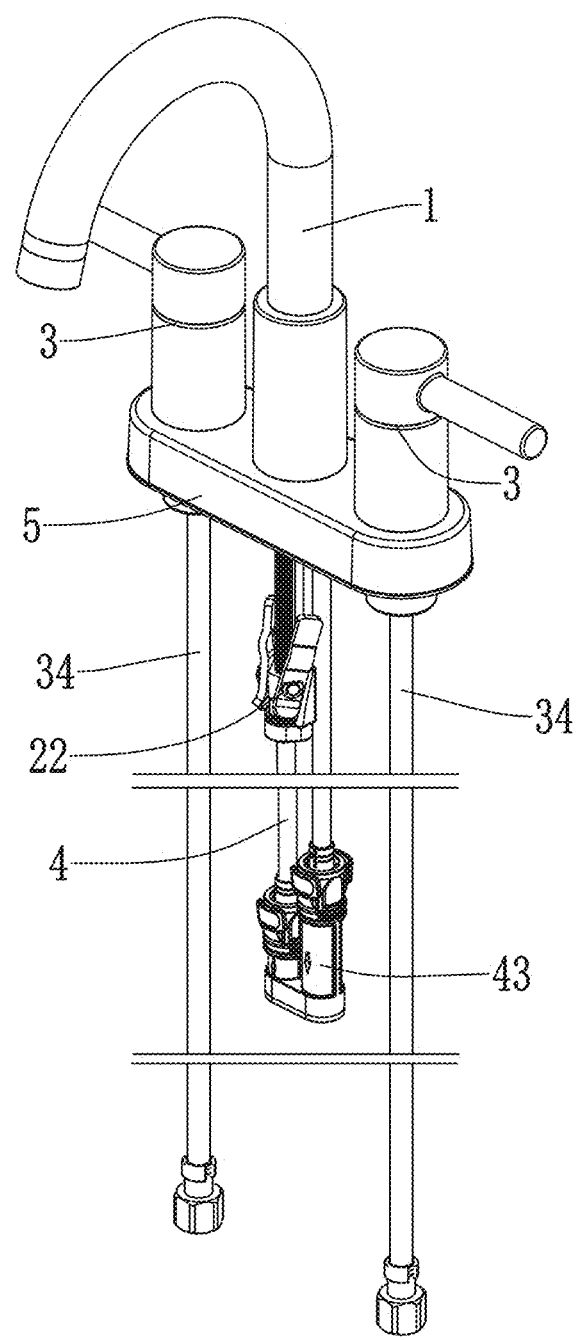
FIG. 7 illustrates a perspective view of a double-handle faucet in Embodiment 2 of the present disclosure.
Figure 8:
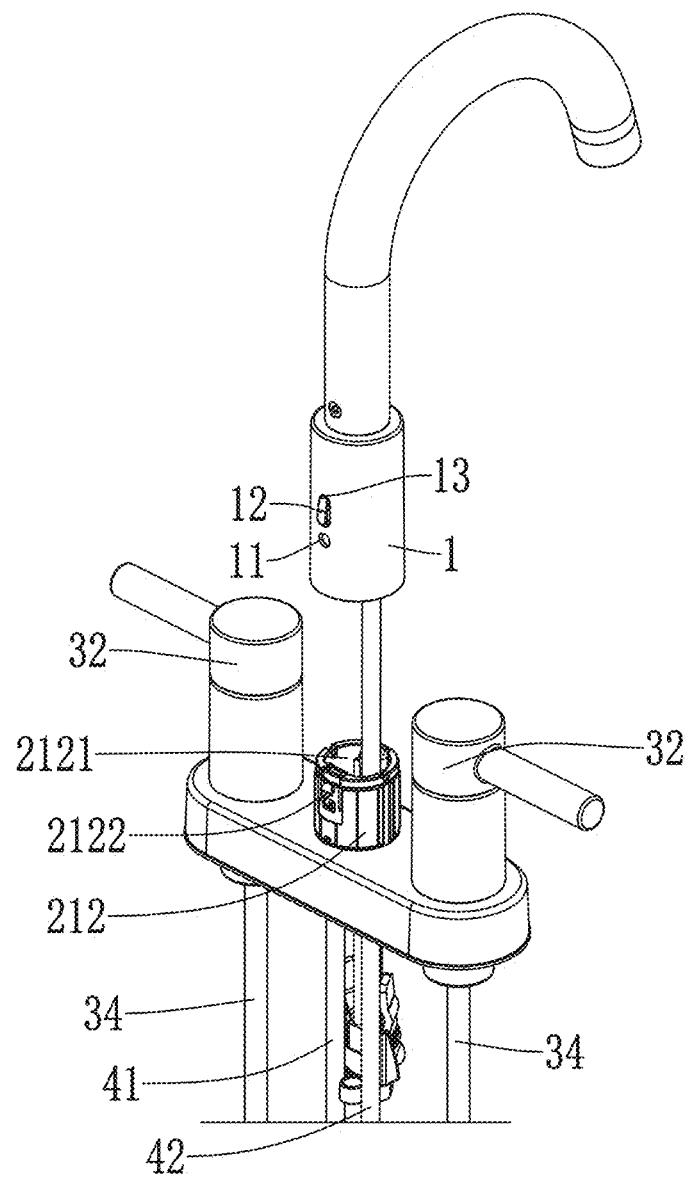
FIG. 8 illustrates a perspective view of the double-handle faucet in Embodiment 2 of the present disclosure, when a water outlet member is detached from a mounting base.
Figure 9:
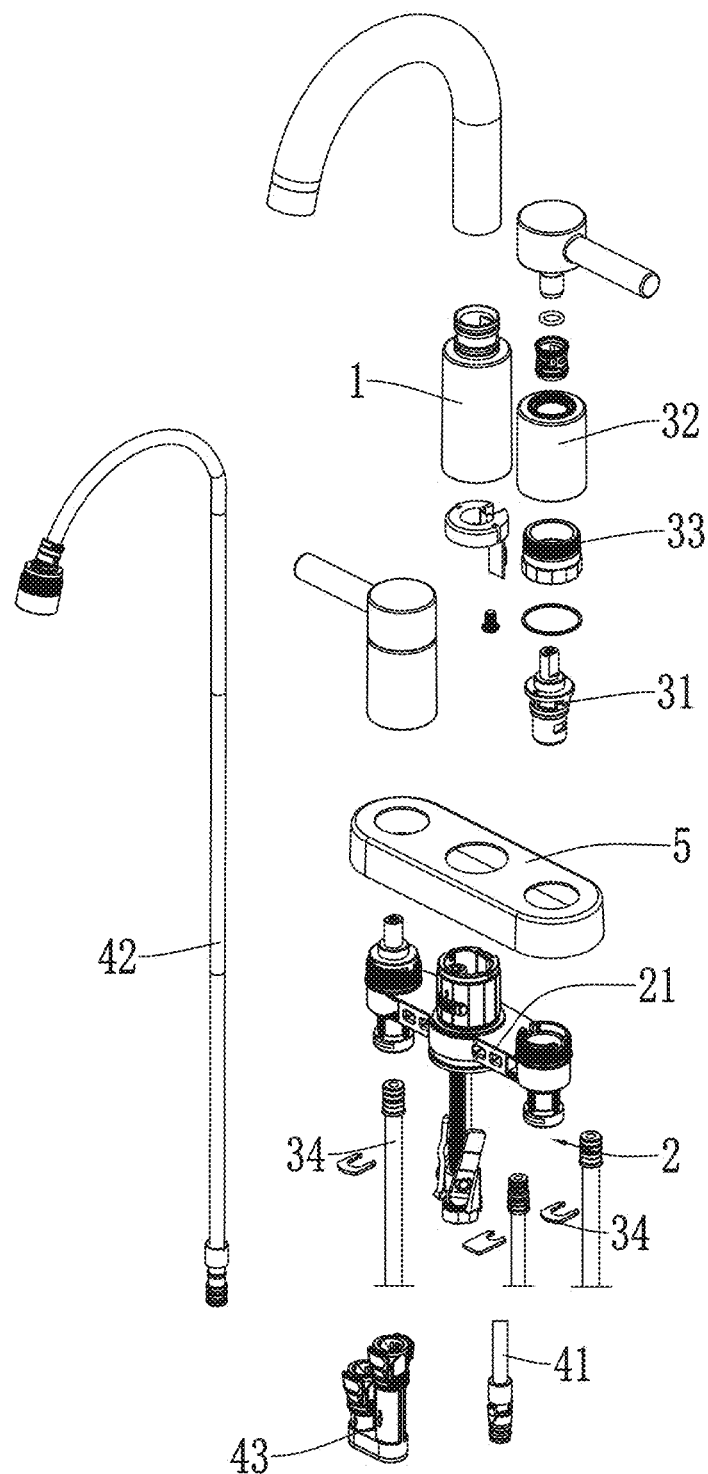
FIG. 9 illustrates an exploded view of the double-handle faucet in Embodiment 2 of the present disclosure.
Figure 10:
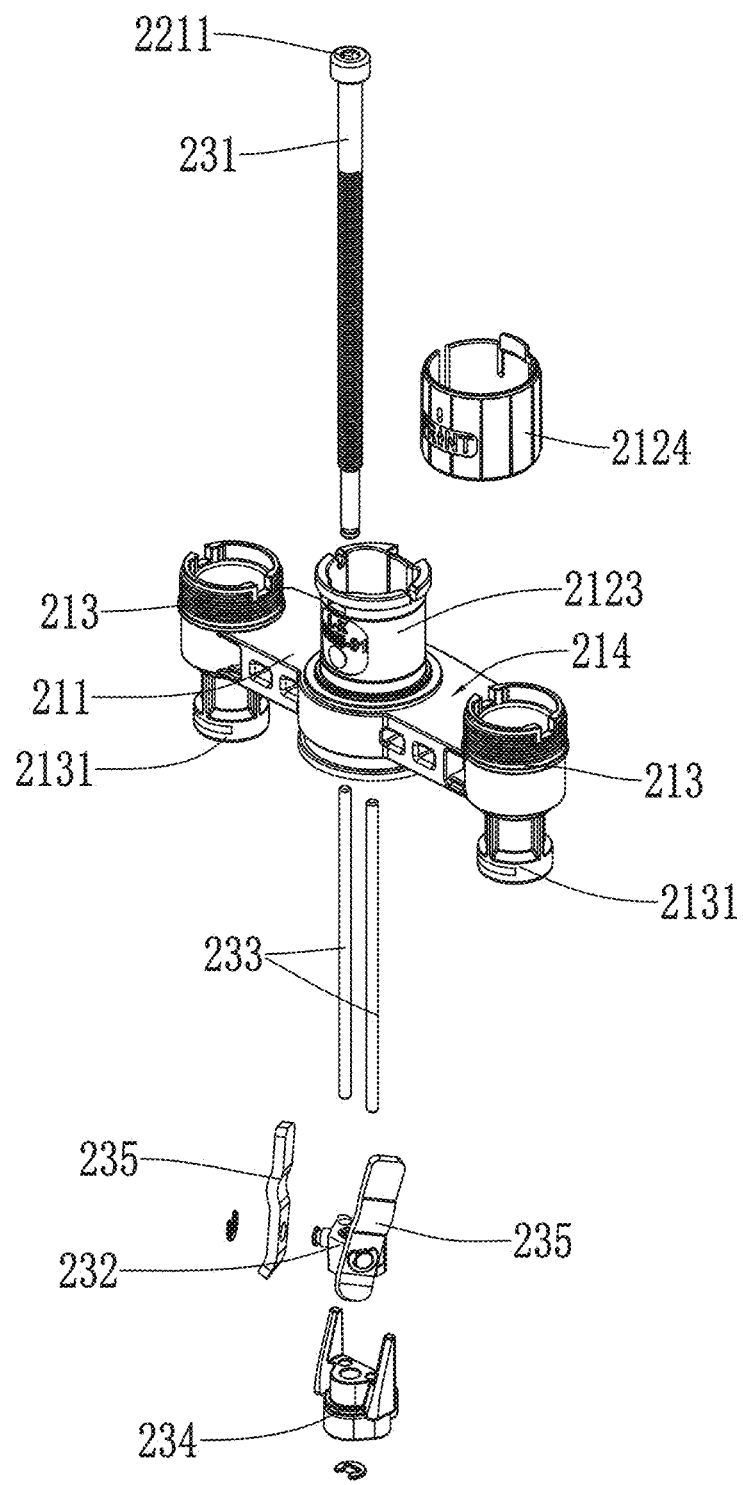
FIG. 10 illustrates an exploded view of a countertop installation assembly in Embodiment 2 of the present disclosure.
Figure 11:
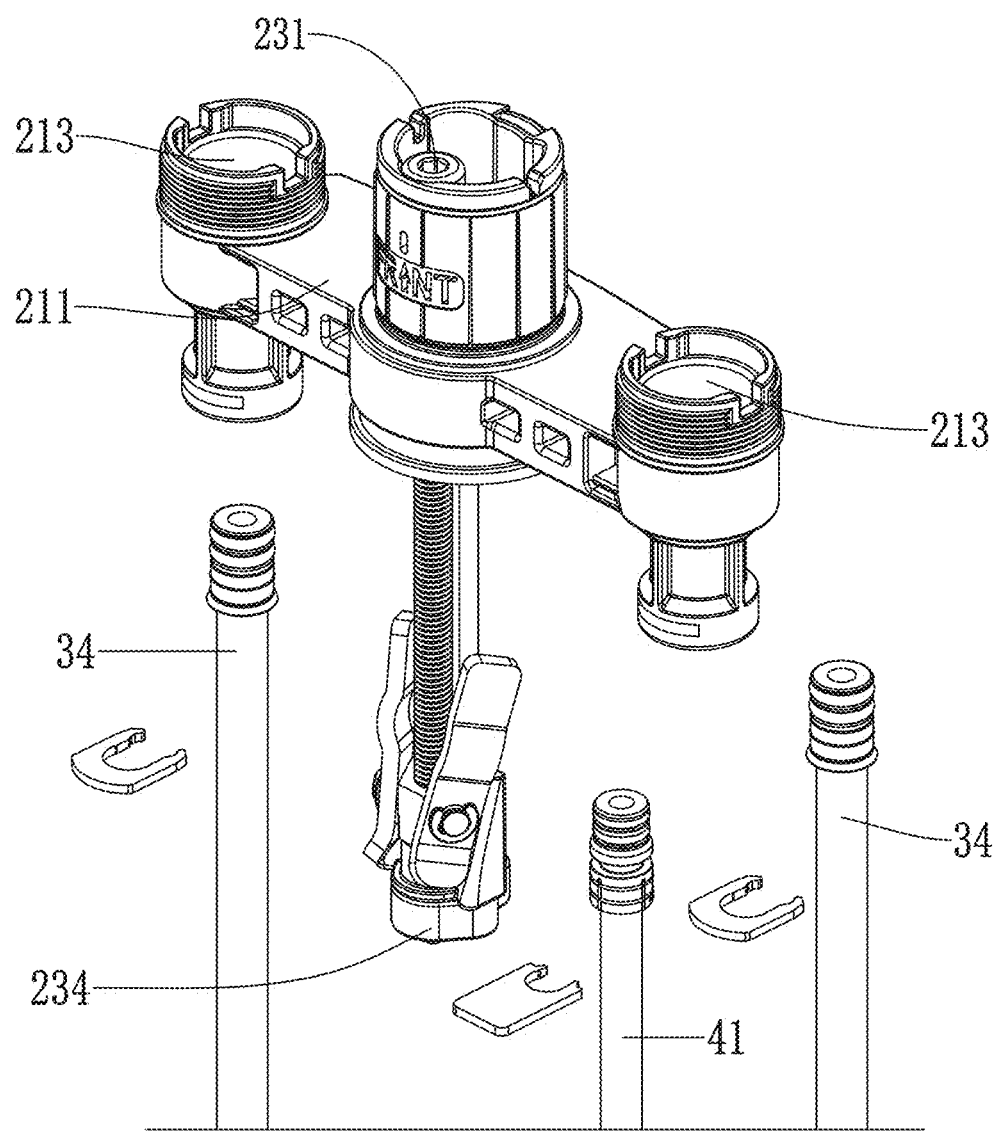
FIG. 11 illustrates an exploded view of water inlet pipes and two valve body cavities in Embodiment 2 of the present disclosure.
Figure 12:
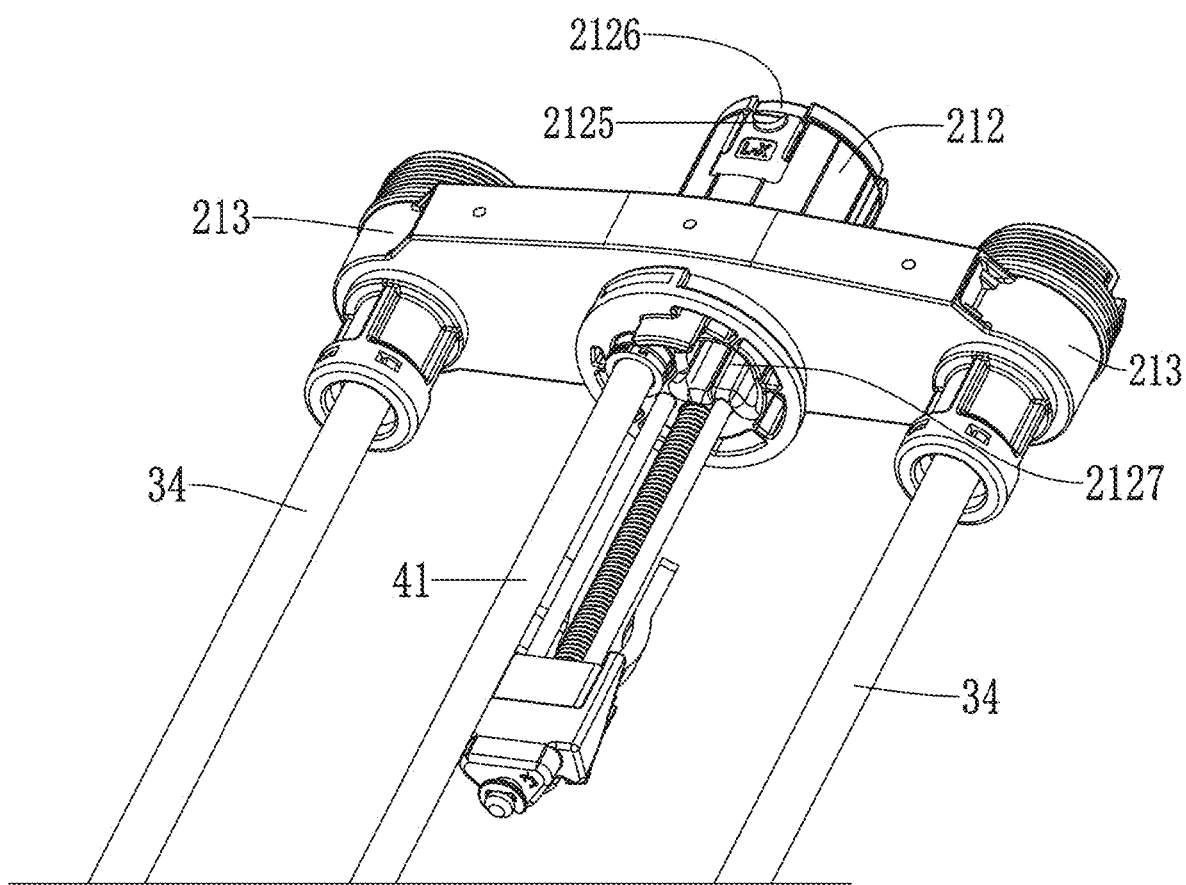
FIG. 12 illustrates a bottom view of the countertop installation assembly in Embodiment 2 of the present disclosure.
Figure 13:
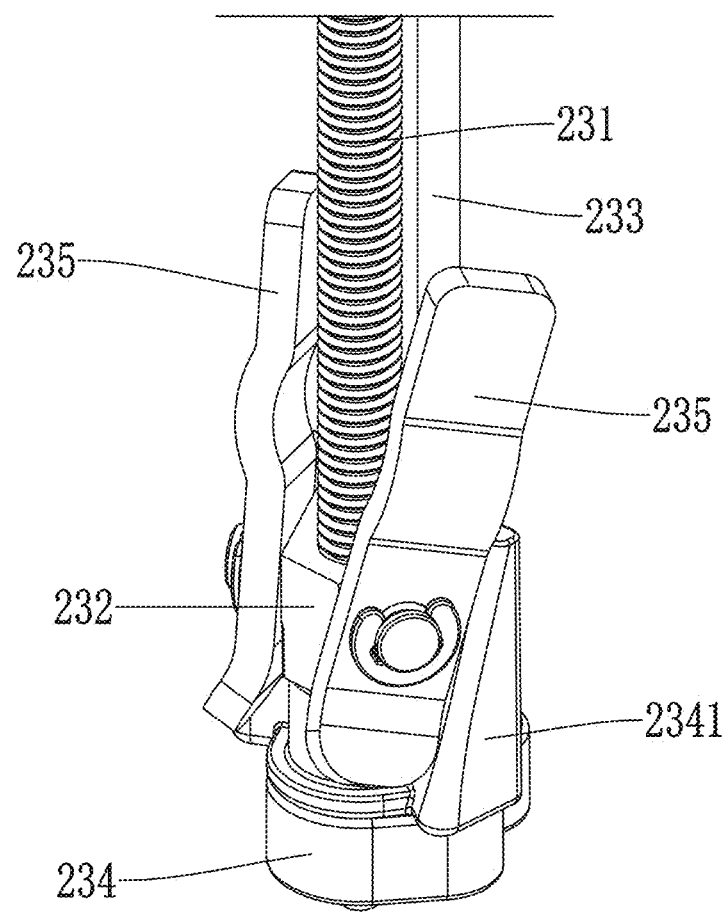
FIG. 13 illustrates a perspective view of two supporting arms of a locking assembly in a folded state in Embodiment 2 of the present disclosure.
Figure 14:
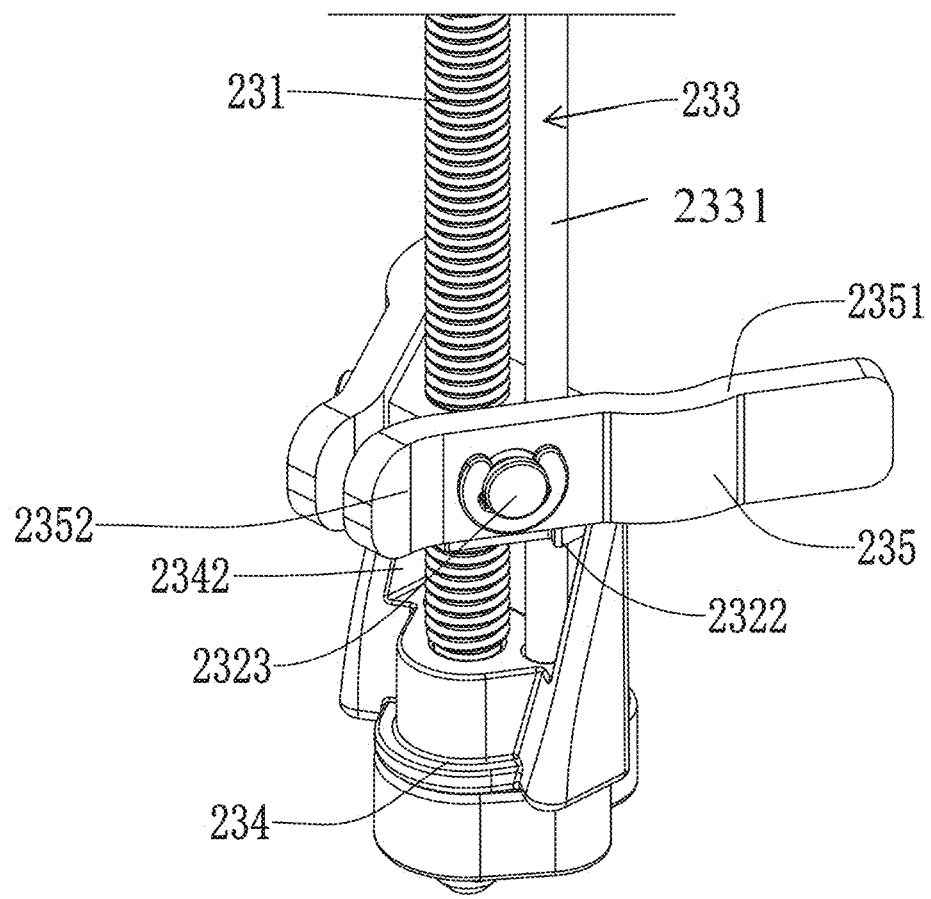
FIG. 14 illustrates a perspective view of the two supporting arms of the locking assembly in an unfolded state in Embodiment 2 of the present disclosure.
Figure 15:
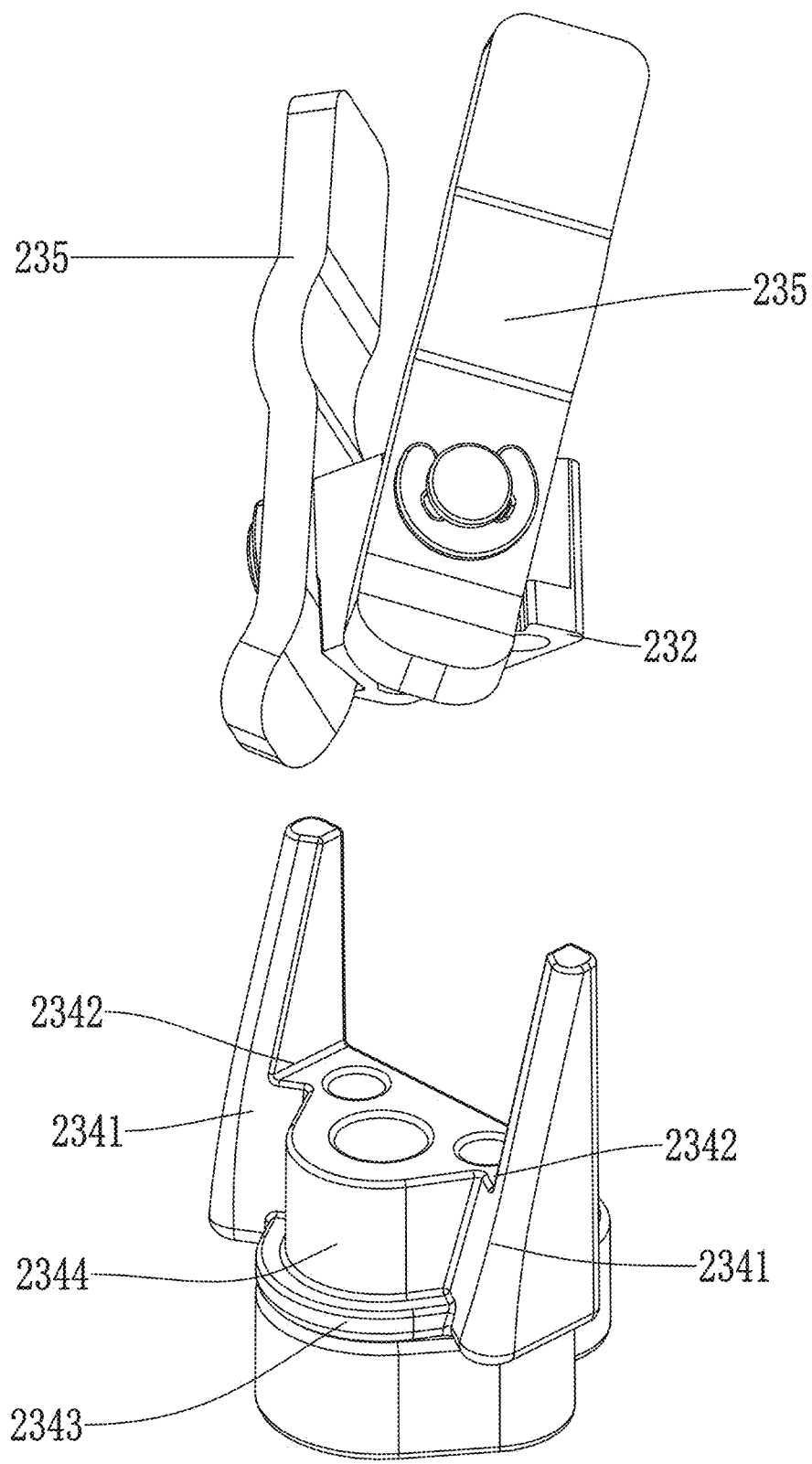
FIG. 15 illustrates a perspective exploded view of the locking assembly in Embodiment 2 of the present disclosure, when a connection base, two supporting arms, and a base are being connected.
Figure 16:
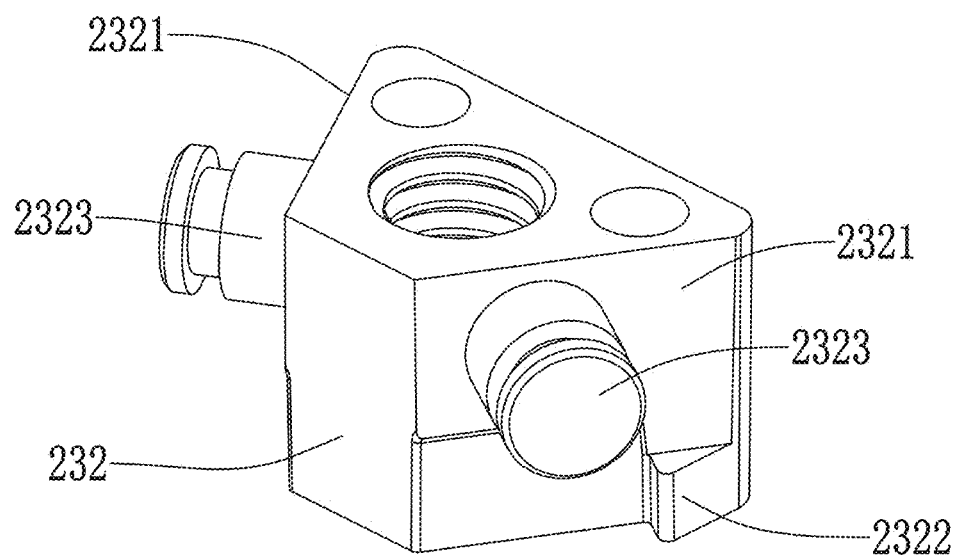
FIG. 16 illustrates a perspective view of the connection base in Embodiment 2 of the present disclosure.
Figure 17:
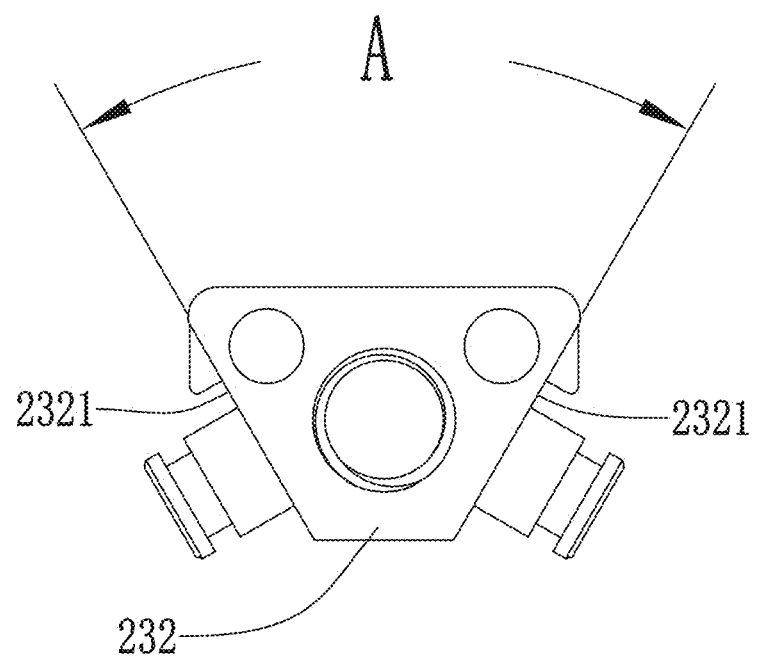
FIG. 17 illustrates a bottom view of the connection base in Embodiment 2 of the present disclosure, illustrating an angle A between two side end surfaces of the connection base.
Figure 18:
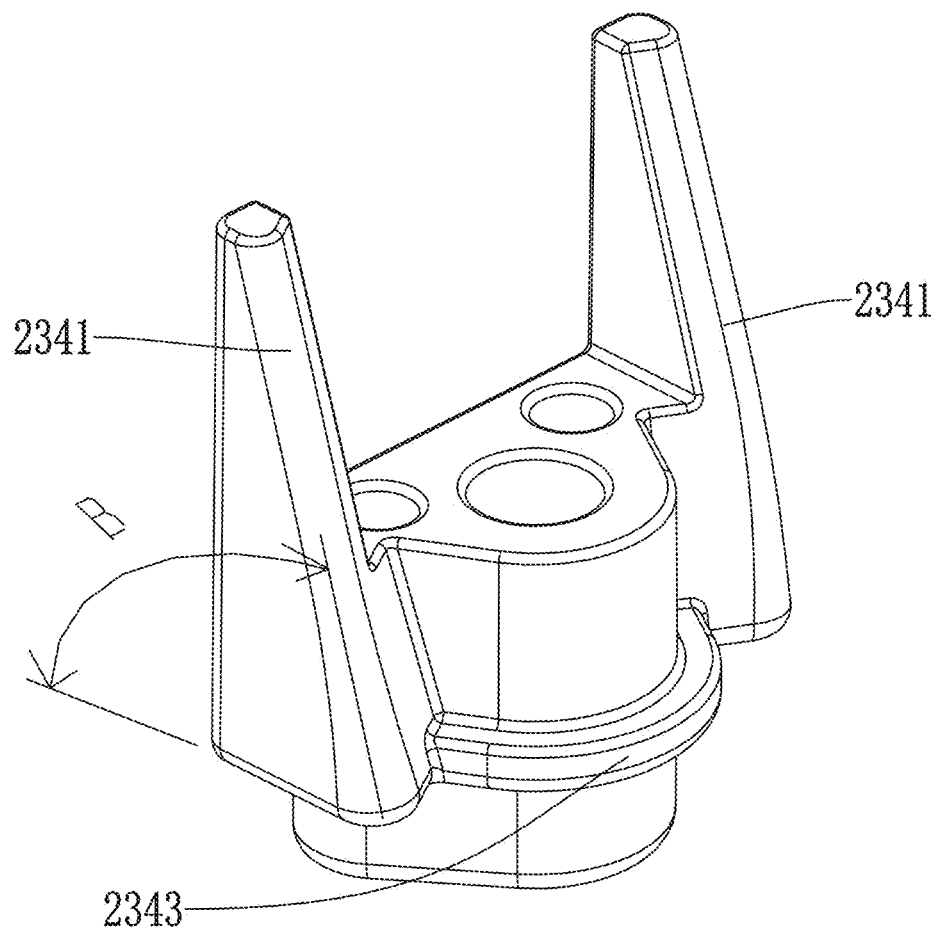
FIG. 18 illustrates a perspective view of the base in Embodiment 2 of the present disclosure, illustrating an angle B of an inclined surface of each of two blocking inclined walls.
Figure 19:
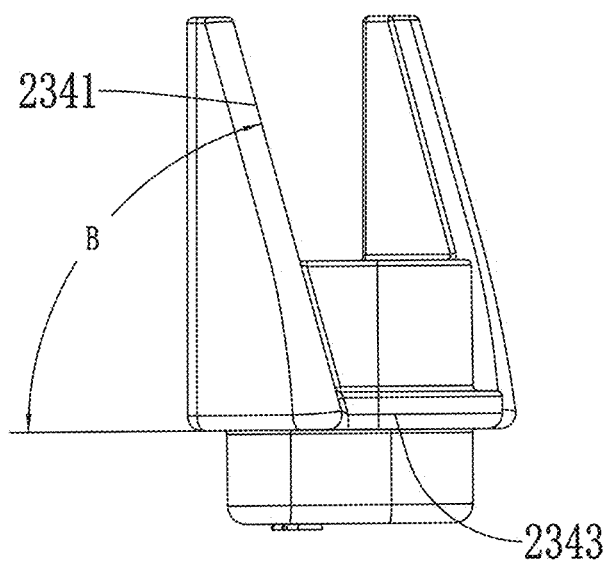
FIG. 19 illustrates a side view of the base in Embodiment 2 of the present disclosure, illustrating the angle B of the inclined surface of each of the two blocking inclined walls.

The threaded rod 231 and the guiding member 233 are connected to the base 234 and the mounting base 212 similar to the structure as shown in FIG. 6. The threaded rod 231 is rotatably mounted on the mounting base 212.

In practical use, an upper end of the threaded rod 231 is connected to the mounting base 212, and a lower end of the threaded rod 231 is connected to the base 234. Upper ends and Lower ends of the two guiding pins 2331 are respectively fixedly connected to the mounting base 212 and the base 234. The two guiding pins 2331 pass through the connection base 232, and the threaded rod 231 is threadedly connected to the connection base 232. When the threaded rod 231 is rotated, the connection base 232 can only move along the two guiding pins 2331 due to a guiding action of the two guiding pins 2331, changing a rotation of the threaded rod 231 to vertical movement of the connection base 232. When the connection base 232 approaches the base 234, the two supporting arms 235 in the unfolded state are pushed by the distal ends of the two blocking inclined walls 2341 to rotate until the connection base 232 abuts the base 234, so that the two supporting arms 235 fully abut the two blocking inclined walls 2341. At this point, an angle between each of the two supporting arms 235 and the bottom plate 2343 is 75 degrees. When the connection base 232 moves away from the base 234, the two supporting arms 235 gradually move away from the base 234, and the long sections 2351 of the two supporting arms 235 rotate downward due to the gravity. When the long sections 2351 of the two supporting arms 235 leave the two blocking inclined walls 2341, the long sections 2351 of the two supporting arms 235 are supported on the two supporting blocks 2322, and the angle between the two supporting arms 235 is 60 degrees.

An upper end of the threaded rod 231 comprises a connecting port 2211. The connecting port 2211 is a hex socket. The connecting port 2211 is located on an upper side of the mounting base 212, so the user can directly operate the connecting port 2211 from above the countertop to enable the locking assembly 22 to be connected to the countertop. The countertop is clamped between the mounting panel 21 and the locking assembly 22.

The double-handle faucet further comprises a decorative panel 5, which covers the upper side of the mounting panel 21.

The aforementioned embodiments are merely some embodiments of the present disclosure, and the scope of the disclosure is not limited thereto. Thus, it is intended that the present disclosure cover non-substantive modifications of the present disclosure provided they are made based on the concept within the technical scope disclosed in the present disclosure by any technical person skilled in the art.

What is claimed is:

1. A double-handle faucet, comprising:
   a water outlet member,
   a countertop installation assembly, and
   two valve assemblies, wherein:
   the countertop installation assembly comprises a mounting panel and a locking assembly,
   the mounting panel comprises a panel body, a mounting base, and two valve body cavities,
   the mounting base and the two valve body cavities are fixedly disposed on the panel body,
   the mounting panel is configured be disposed on an upper side of a countertop,
   the locking assembly is correspondingly connected to a lower side of the mounting base,
   the mounting base is operatively coupled to the locking assembly to be configured to drive at least part of the locking assembly to abut a lower side of the countertop,
   the two valve assemblies are respectively connected to the two valve body cavities,
   the water outlet member is detachably connected to the mounting base,
   a valve body water channel is formed within the mounting panel,
   the valve body water channel is connected to each of the two valve body cavities,
   a water outlet pipe is connected to a lower side of the mounting panel,
   the water outlet pipe is connected to the valve body water channel,
   the water outlet pipe extends through the mounting base, and
   the water outlet pipe is fluidly connected to the water outlet member.

2. The double-handle faucet according to claim 1, wherein:
   the water outlet pipe comprises a first water outlet pipe and a second water outlet pipe,
   the first water outlet pipe is connected to the lower side of the mounting panel,
   the second water outlet pipe is connected to the water outlet member, and
   the first water outlet pipe and the second water outlet pipe are connected together by a connector.

3. The double-handle faucet according to claim 1, wherein:
   the mounting base comprises a passing channel penetrating through the mounting base, and
   the water outlet pipe passes through the passing channel.

4. The double-handle faucet according to claim 1, wherein:
   lower ends of the two valve body cavities comprise connecting members,
   the two valve assemblies comprise water inlet pipes, and
   distal ends of the water inlet pipes are detachably connected to the connecting members.

5. The double-handle faucet according to claim 4, wherein:
   the distal ends of the water inlet pipes and the connecting members are connected together via threading or buckling.

6. The double-handle faucet according to claim 1, wherein:
   each of the two valve assemblies comprises a valve core and a handle assembly,
   the valve core is disposed in a corresponding one of the two valve body cavities, and
   the handle assembly is connected to the valve core.

7. The double-handle faucet according to claim 1, wherein:
   the mounting base comprises a buckle member,
   a lower end of the water outlet member is configured to be sleeved on the mounting base,
   the lower end of the water outlet member comprises a locking hole,
   the buckle member is operatively locked to the locking hole,
   the water outlet member comprises an operating button,
   the operating button is configured to be pressed inward radially by an external force,
   the operating button is configured to push the buckle member to move radially to be separated from the locking hole,
   the buckle member is configured to be elastically deformed to rotate around a lower end of the buckle member,
   the buckle member comprises a buckling protrusion,
   an outer side of an upper end of the buckle member comprises a matching notch,
   the operating button is configured to be elastically deformed to rotate around an upper end of the operating button,
   a lower end of the operating button is configured to be correspondingly matched with the matching notch, and
   when the operating button is pressed inward radially by the external force to rotate radially inward, the lower end of the operating button pushes the upper end of the buckle member inward to enable the buckling protrusion to be separated from the locking hole.

8. The double-handle faucet according to claim 7, wherein:
   the lower end of the water outlet member comprises an operating through hole, and
   the operating button passes through the operating through hole.

9. The double-handle faucet according to claim 7, wherein:
the mounting base comprises a base body and a connecting sleeve,
the base body is integrally formed with the panel body,
the connecting sleeve is sleeved outside the base body, and
the water outlet member is detachably connected to the connecting sleeve.

10. The double-handle faucet according to claim 9, wherein:
the base body comprises a middle through hole, and
the water outlet pipe passes through the middle through hole.

11. The double-handle faucet according to claim 1, wherein:
the locking assembly comprises a threaded column, a movable member, and an abutment member,
the threaded column is operatively rotatably disposed on the mounting base,
the movable member is threaded to the threaded column,
when the threaded column is rotated, the movable member moves up and down along the threaded column to abut the lower side of the countertop,
the locking assembly comprises a plug and two guiding pins,
the plug is located below the mounting base,
the two guiding pins are connected to the plug and the mounting base,
the movable member is slidably disposed on the two guiding pins,
the abutment member comprises two rotating rods,
the two rotating rods are rotatably connected to two sides of the movable member, and
rotation centers of the two rotating rods are offset from middle positions of the two rotating rods.

12. The double-handle faucet according to claim 1, wherein:
the double-handle faucet comprises a decorative panel, and
the decorative panel covers an upper side of the mounting panel.

13. The double-handle faucet according to claim 1, wherein:
the locking assembly comprises a threaded rod, a connection base, a guiding member, a base, and two supporting arms,
the threaded rod and the guiding member are each connected to the base,
the connection base is connected to and guided by the guiding member,
the connection base is threaded to the threaded rod,
the threaded rod is configured to be rotated by an external force to drive the connection base to move adjacent to or away from the base,
sides of the two supporting arms are respectively pivotally connected to two side end surfaces of the connection base,
the base comprises two blocking inclined walls,
the two supporting arms are configured to be moved adjacent to the two blocking inclined walls to be rotated to be in a folded state,
the two supporting arms are configured to be moved away from the two blocking inclined walls to be rotated to be in an unfolded state,
when in the unfolded state, a radial dimension of the two supporting arms is larger than a size of a mounting hole of the countertop,
an angle between the two side end surfaces of the connection base is between 25 degrees and 75 degrees, and
an angle of an inclined surface of each of the two blocking inclined walls is between 45 degrees and 85 degrees.

14. The double-handle faucet according to claim 13, wherein:
the angle between the two side end surfaces of the connection base is 60 degrees, and
the angle of the inclined surface of each of the two blocking inclined walls is 75 degrees.

15. The double-handle faucet according to claim 13, wherein:
the two side end surfaces are respectively disposed with two supporting blocks,
first ends of the two supporting arms are pivotally connected to the two side end surfaces, and
when in the unfolded state, second ends of the two supporting arms are supported on the two supporting blocks.

16. The double-handle faucet according to claim 15, wherein:
the two supporting blocks are located below the two supporting arms, and
lower sides of the second ends of the two supporting arms are supported on the two supporting blocks.

17. The double-handle faucet according to claim 15, wherein:
insides of the two blocking inclined walls comprise two position-provided slots, and
when the connection base moves adjacent to the two blocking inclined walls, the two supporting blocks enter the two position-provided slots.

18. The double-handle faucet according to claim 13, wherein:
two pivot shafts are disposed on the two side end surfaces, and
the two supporting arms are pivotally connected to the two pivot shafts.

19. The double-handle faucet according to claim 13, wherein:
the base comprises a bottom plate, a seat, and the two blocking inclined walls,
the seat and the two blocking inclined walls are disposed on the bottom plate,
the two blocking inclined walls are disposed on two sides of the seat, and
the threaded rod and the guiding member are connected to the seat.

20. The double-handle faucet according to claim 13, wherein:
the guiding member comprises two guiding pins.

21. The double-handle faucet according to claim 13, wherein:
the threaded rod and the guiding member are connected to the base and the mounting base, and
the threaded rod is rotatably mounted on the mounting base.

22. The double-handle faucet according to claim 13, wherein:
when the two supporting arms are in the folded state, front sides and rear sides of the two supporting arms extend beyond the connection base and the base.

23. The double-handle faucet according to claim 13, wherein:

the threaded rod and the guiding member are within a vertical projection of the connection base.

24. The double-handle faucet according to claim 14, wherein:
the two side end surfaces are respectively disposed with two supporting blocks,
first ends of the two supporting arms are pivotally connected to the two side end surfaces, and
when in the unfolded state, second ends of the two supporting arms are supported on the two supporting blocks.

25. The double-handle faucet according to claim 24, wherein:
the two supporting blocks are located below the two supporting arms, and
lower sides of the second ends of the two supporting arms are supported on the two supporting blocks.

26. The double-handle faucet according to claim 24, wherein:
insides of the two blocking inclined walls comprise two position-provided slots, and
when the connection base moves adjacent to the two blocking inclined walls, the two supporting blocks enter the two position-provided slots.

\* \* \* \* \*